United States Patent
Ricciulli

(10) Patent No.: US 6,973,040 B1
(45) Date of Patent: Dec. 6, 2005

(54) METHOD OF MAINTAINING LISTS OF NETWORK CHARACTERISTICS

(75) Inventor: Livio Ricciulli, Los Gatos, CA (US)

(73) Assignee: netZentry, Inc., Palo Alto, CA (US)

(*) Notice: Subject to any disclaimer, the term of this patent is extended or adjusted under 35 U.S.C. 154(b) by 657 days.

(21) Appl. No.: 09/805,490

(22) Filed: Mar. 13, 2001

Related U.S. Application Data

(60) Provisional application No. 60/188,620, filed on Mar. 13, 2000.

(51) Int. Cl.$^7$ .............................................. H04L 12/26
(52) U.S. Cl. ..................................................... 370/241
(58) Field of Search ............................. 370/241, 241.1, 370/248, 252, 395.31, 395.52, 428; 709/224, 709/225, 228; 713/200, 201

(56) References Cited

U.S. PATENT DOCUMENTS

| | | | | |
|---|---|---|---|---|
| 5,687,168 A | * | 11/1997 | Iwata | 370/255 |
| 6,128,296 A | * | 10/2000 | Daruwalla et al. | 370/389 |
| 6,400,681 B1 | * | 6/2002 | Bertin et al. | 370/218 |
| 6,611,525 B1 | * | 8/2003 | Natanson et al. | 370/395.53 |
| 6,807,172 B1 | * | 10/2004 | Levenson et al. | 370/389 |

* cited by examiner

Primary Examiner—Kwang Bin Yao
(74) Attorney, Agent, or Firm—Swernofsky Law Group PC

(57) ABSTRACT

Various embodiments include a method of maintaining lists of network characteristics of messages. The messages can be detected. The messages can travel near at least the first network node. The messages can comprise network characteristics. The lists of network characteristics of the messages can be updated. The lists include instances of the network characteristics, based on a frequency of occurrences of the instances.

82 Claims, 4 Drawing Sheets

METHOD OF MAINTAINING LISTS OF NETWORK CHARACTERISTICS

CROSS REFERENCE TO RELATED APPLICATION

This application claims the priority of U.S. Provisional Application No. 60/188,620 filed on Mar. 13, 2000 which application is hereby incorporated herein by reference.

BACKGROUND OF THE INVENTION

1. Field of the Invention

The field relates to detecting or documenting attacks on a network. More particularly, the field relates to detecting or documenting attacks such as flooding without imposing unreasonable demands on routers, such as demanding large amounts of state.

2. Description of Related Art

Two examples of widely used Transmission Control Protocol (TCP)-based protocols are hypertext transfer protocol (HTTP) and file transfer protocol (FTP). These two protocols are becoming more important for the exchange of information over the Internet and are affected by the "SYN flooding" type of denial-of-service attack. A denial-of-service attack on an Internet network by TCP "SYN flooding" hinders the signaling mechanism, called "handshaking," that is used to establish TCP connections. When such an attack occurs, the affected network resources, such as an Internet server, are degraded in their ability to handle message traffic, resulting in a denial-of-service condition.

A client computer and a server computer can establish a virtual connection using Transmission Control Protocol/Internet Protocol (TCP/IP) via handshaking, such as three-way handshaking.

The "SYN flood" attack takes advantage of the TCP/IP handshaking process by sending numerous SYN packets with false ("spoofed") return addresses to a communications port on a server. The server sends out a SYN-ACK message to each return address for each of these SYN packets. The SYN-ACK message is simply lost in the network. The server never receives any ACK messages back because there are no client systems at the spoofed return addresses. The server, therefore, keeps waiting in vain for an ACK message and may keep a queue entry allocated, for example, for several seconds. In sending out the SYN-ACK messages, the server uses up memory resources and queues a half-open connection for each spoofed SYN message. After a predetermined waiting period, the server times out waiting for a SYN message and closes the corresponding half-open connection. On many systems the time out values are on the order of approximately one second, so the server's connection request queue can be depleted relatively slowly. After the server has enough half-open connections to fill up its queue, the server will start to drop subsequent SYN messages, such that legitimate SYN connection requests start to be ignored. On certain systems, the allowable half-open connection queue space may be as little as eight connections.

Thus, SYN flooding attacks reduce (or eliminate) the ability of the targeted server system to respond to legitimate connection requests. An attacker can generally leisurely fill the server's connection request queue before earlier SYN messages reach a time out condition. The SYN flooding denial-of-service attack, if not dealt with properly, requires very little computation and bandwidth commitment from malicious users. Although SYN flooding requires an attacker to continuously flood a target system (otherwise within a few minutes the target will revert to normal operation), it is difficult to trace to the source of the SYN packets. Thus, the SYN flooding technique remains a viable attack.

Potential loss of revenue caused by preempting reliable TCP communications is enormous, and therefore adequate mechanisms for dealing with SYN flooding are needed. Current SYN flooding defense mechanisms seem to have greatly mitigated the problem by making it harder for an attacker to negatively affect service. The most popular approach uses a "brute force" technique. In this approach, the TCP "connection pending" data structure (implementing the connection request queue) is made sufficiently large that an average attacker, to be successful, would need to flood connection requests at a rate exceeding reasonable bandwidth capabilities. This solution, although sometimes very practical, requires large amounts of protected kernel memory and may slow down the server response time for looking up connections in the vast "connection pending" data structure. Other less popular techniques use one-way hash functions (with Internet "cookies") to verify the authenticity of connection requests and therefore eliminate unnecessary memory allocation. Some of these latter techniques can introduce changes in the TCP signaling behavior and are therefore less favored. Firewall approaches actively monitor the TCP signaling traffic to detect possible attacks and inject ad-hoc signaling messages in the network to mitigate the denial-of-service attack. These approaches are awkward because they introduce additional administrative complexity, may introduce significant delays for legitimate connection establishment, or may expose the system to different, though arguably less severe, kinds of vulnerabilities.

No one mechanism seems to provide an optimal solution, and thus a careful protection approach is usually constructed by using a combination of techniques. What is needed is a solution that can complement or replace existing solutions.

SUMMARY OF THE INVENTION

Various embodiments include a method of maintaining lists of network characteristics of messages. The messages can be detected. The messages can travel near at least the first network node. The messages can comprise network characteristics. The lists of network characteristics of the messages can be updated. The lists include instances of the network characteristics, based on a frequency of occurrences of the instances.

DETAILED DESCRIPTION OF SPECIFIC EMBODIMENTS

Figure 1:
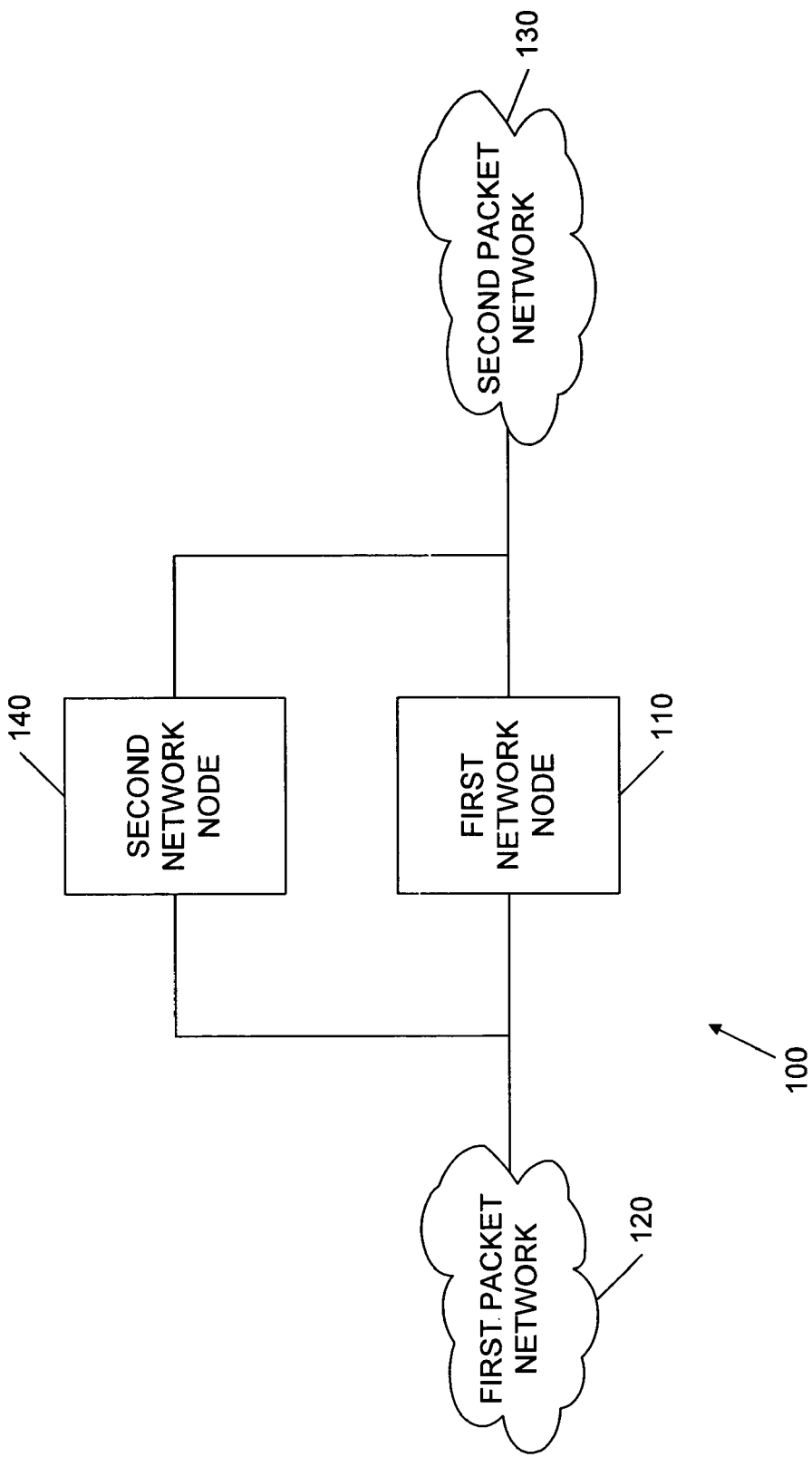
FIG. 1 shows one embodiment for maintaining one or more lists of one or more network characteristics.

Various embodiments can detect a source or sources of a flooding attack. One embodiment can identify such sources by sending a packet into the network which can follow the offending traffic upstream. The packet can follow the stream in the reverse direction by going to routers which have a record of the attacked destination address in their top-N most used destination addresses. Once the PROBE packet reaches the end of the path and, for any reason, cannot go any further, the last router will send report packet back to the destination.

Various embodiments of flooding detection can have one or more of the following features: (1) working at the IP level; (2) targeted to flooding in general; and/or (3) deployable without compromising anonymity. With some embodiments, real-time detection of the source of flooding attacks can be performed without requiring a large amount of state in routers.

Various embodiments have routers with one or more lists of top-N more seen or most seen network characteristics, for example, destination addresses, in a small cache. This list can vary with time relatively slowly, for example, on the order of seconds for some embodiments. In some embodiments, the cache can have a number of instances of network characteristics substantially equal to or greater than C/F, where C can be a total aggregate capacity of a router, and F can be a minimum sustained flooding rate to detect. For example, to detect a 1 MB/s flooding on a 1 GB/s router, a cache of 1000 instances may by adequate. In one embodiment, listed instances can include a destination address and an ingress port.

When an attack, such as flooding, is detected, a message can be sent upstream by the attacked network node. For example, the message payload can contain a return address R, a network/host address H and/or a cookie generated by the attacked network node.

In some embodiments, an upstream router can look up H to check for a match in one or more lists of the local cache. If a match results, the router can forward a message upstream to appropriate interfaces. This can repeat recursively with routers further upstream.

In some embodiments, if an upstream router does not find H in the local cache, a report message can be sent to R with, for example, interface information of a downstream neighbor and the cookie. In some embodiments, this can be identified as an entry point of the attack, such as the flood.

If the upstream router does not implement this mechanism the router will send a report packet to R with its interface information and/or the cookie (this will be identified as the entry point of the flood).

R can receive the report message and/or cookie. This information can activate an upstream filtering defense. The relevant ISP or authorities can be notified.

An attacker can avoid being traced back by, for example, reducing the rate of packets and/or rotating destination addresses. The flooding can then be dispersed spatially and/or temporally, thus reducing bad effects of the attack. This can work for DDoS, since the message can be sent upstream on different interfaces in a multipath fashion. Filtering rules can be dynamically installed on an identified entry point, and/or the whole path. Some embodiments introduce hysteresis in the top-N list.

In another embodiment of this invention, the message can carry a cryptographic credential such as a certificate. When the message reaches a router which can send the report message back to the attacked network node, the credential can be verified. A filter can be set up to block traffic to destination H.

FIG. 1 shows one embodiment for maintaining one or more lists of one or more network characteristics 100. A first network node 110 can be coupled to a first packet network 120 and a second packet network 130. Examples of packet networks include ATM and IP networks. The first network node 110, can be, for example, a router through which messages travel between the first packet network 120 and the second packet network 130. A second network node 140 can be coupled to the first network node 110. Other embodiments of the second network node 140 can be coupled differently, for example, coupled to one side of the first network node 110, or coupled to more ports or routes coupled to the first network node 110. The second network node 140 can detect the messages traveling near the first network node 110. For example, the second network node 140 can detect messages traveling by or through the first network node 110. Some embodiments of the second network node 140 can record the messages traveling near the first network node 110. One embodiment of the second network node 140 includes a sniffer such as a packet sniffer to detect the messages traveling near the first network node 110. Some of the messages traveling near the first network node 110 can be, for example, recursive messages and/or multipath messages.

Figure 2:
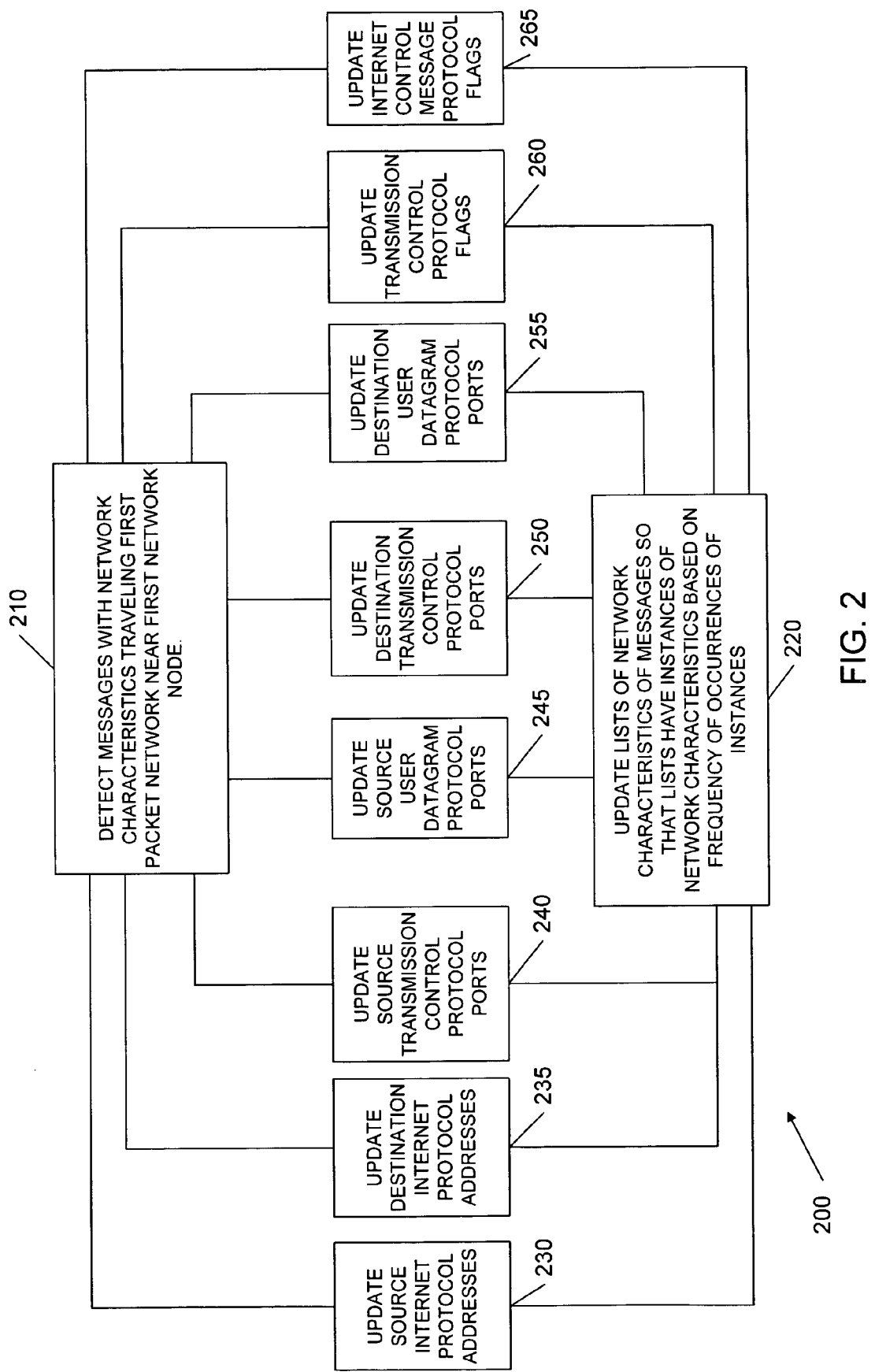
FIG. 2 shows a flow chart of one embodiment for maintaining one or more lists of one or more network characteristics.

FIG. 2 shows a flowchart 200 of one embodiment for maintaining one or more lists of one or more network characteristics. Various embodiments can alter, add to, delete from, and/or reorder elements of the flowchart 200. In 210, messages traveling a first packet network can be detected. The messages can have network characteristics. In 220, lists of network characteristics of messages can be updated, so that lists have instances of network characteristics based on frequency of occurrences of instances. The lists can have a group of more or most frequently occurring instances of the network characteristics. The frequency of occurrences can include a number of occurrences in an amount of time. In one embodiment, a number of instances in each of the lists can be substantially equal to or greater than a quotient. The quotient can include a capacity rate of a router (for example, first network node 110) divided by a threshold flooding rate.

There are many possible network characteristics that can be updated in 220. For example, IP source addresses 230, destination IP addresses 235, source TCP ports 240, source UDP ports 245, destination TCP ports 250, destination UDP ports 255, TCP flags 260, and/or ICMP flags 265.

Figure 3:
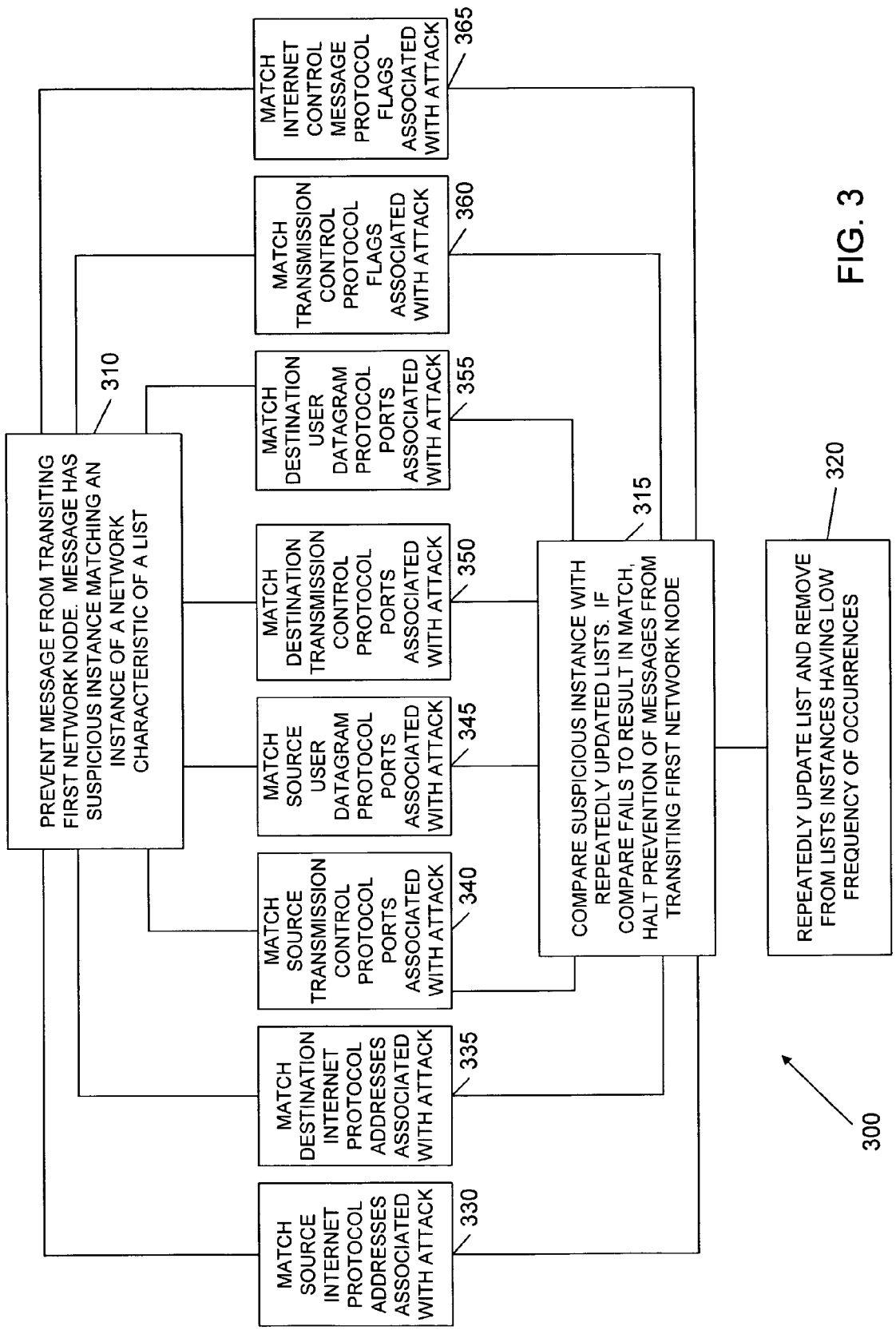
FIG. 3 shows a flow chart of an aspect of some embodiments for maintaining one or more lists of one or more network characteristics.

FIG. 3 shows a flowchart 300 of an aspect of some embodiments for maintaining one or more lists of one or more network characteristics. Various embodiments can alter, add to, delete from, and/or reorder elements of the flowchart 300. In 310, messages can be prevented from transiting the first network node. One embodiment prevents by filtering. Some embodiments prevent, responsive to receiving a message from an attacked network node. The attacked network node may have received a flooding attack and/or a denial of service attack. Such messages can have suspicious instances of network characteristics of lists. The suspicious instances can be associated with attacks on attacked network nodes. In 315, suspicious instances can be compared with repeatedly updated lists. If the compare fails to result in a match, prevention can be halted. One embodiment of halting the preventing can include removing the filter. In 320, lists can be repeatedly updated. Instances having low frequency of occurrences can be removed from lists. In various embodiments, the updating can occur at the second network node 140 an/or a third network node.

There are many possible network characteristics that can be matched in 3150. For example, IP source addresses 330, destination IP addresses 335, source TCP ports 340, source UDP ports 345, destination TCP ports 350, destination UDP ports 355, TCP flags 360, and/or ICMP flags 365.

Figure 4:
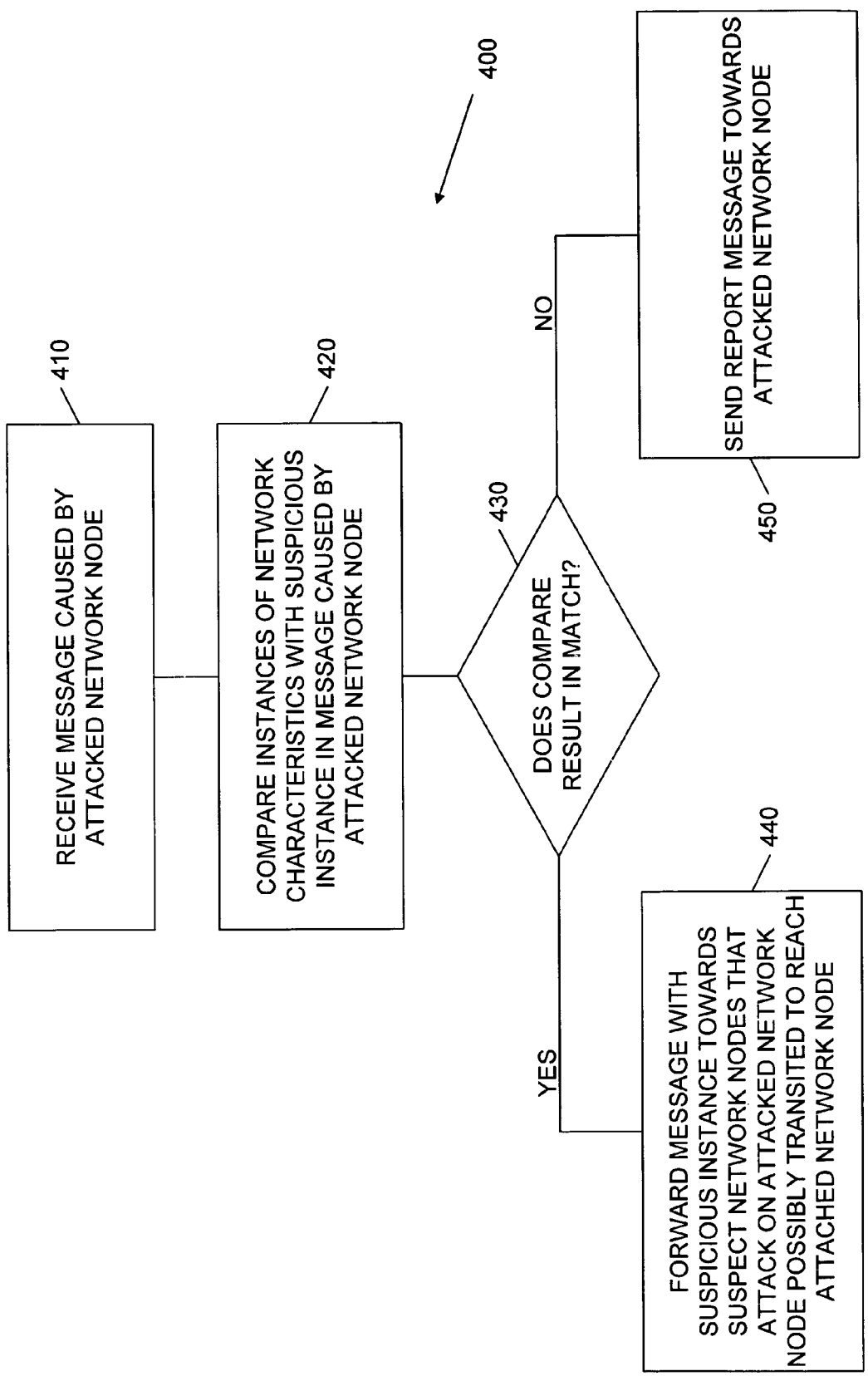
FIG. 4 shows a flow chart of an aspect of some embodiments for maintaining one or more lists of one or more network characteristics.

FIG. 4 shows a flowchart 400 of an aspect of some embodiments for maintaining one or more lists of one or more network characteristics. Various embodiments can alter, add to, delete from, and/or reorder elements of the flowchart 400. In 410, a message can be received. In some embodiments, the message can be received at the second network node 140 or a third network node. In some embodiments, the message can be received from an attacked network node or an intermediate network node. The message can include, for example, a cookie generated by the attacked network node. The message can be caused by an attacked network node. In 420, instances of network characteristics can be compared with the suspicious instance in the message caused by the attacked network node. If the compare results in a match 430, than 440 follows; else 450 follows. In 440, a message with the suspicious instance is forwarded towards suspect network nodes. The attack on the attacked network node possibly transited the suspect nodes. In some embodiments, the forwarded message can include updated information, for example, a network identifier of the forwarding node. In some embodiments, the forwarding can be based at least on an instance of a network characteristic maintained in a list. In 450, a report message can be sent towards the attacked network node.

Various embodiments can comprise elements coupled together physically and/or functionally. The various embodiments of the structures and methods that are described above are illustrative only and do not limit the scope to the particular embodiments described. For example, in view of this disclosure, those skilled in the art can define other variable names, data structures, protocols, etc., and/or other software and/or hardware to use these alternative features, creating a method or apparatus such as a software and/or hardware apparatus. The following claims cover such alternatives.

What is claimed is:

1. A method of maintaining one or more lists of one or more network characteristics of a plurality of messages traveling near at least a first network node coupled to at least a first packet network, comprising:
   detecting the plurality of messages traveling near at least the first network node coupled to at least the first packet network, wherein each of the plurality of messages comprises one or more network characteristics; and
   updating the one or more lists of the one or more network characteristics of the plurality of messages, such that the one or more lists comprise instances of the one or more network characteristics based on at least a frequency of occurrences of the instances.

2. The method of claim 1, wherein the detecting comprises sniffing.

3. The method of claim 1, wherein the detecting comprises recording the plurality of messages.

4. The method of claim 1, wherein traveling near at least the first network node comprises traveling through the first network node.

5. The method of claim 1, wherein the first network node comprises a router.

6. The method of claim 1, wherein the plurality of messages comprise recursive messages.

7. The method of claim 1, wherein the plurality of messages comprise multipath messages.

8. The method of claim 7, wherein multipath messages comprise messages concurrently traveling to different nodes.

9. The method of claim 1, wherein the one or more network characteristics comprise one or more source addresses.

10. The method of claim 9, wherein the one or more source addresses comprise one or more Internet Protocol addresses.

11. The method of claim 1, wherein the one or more network characteristics comprise one or more destination addresses.

12. The method of claim 11, wherein the one or more destination addresses comprise one or more Internet Protocol addresses.

13. The method of claim 1, wherein the one or more network characteristics comprise one or more source ports.

14. The method of claim 13, wherein the one or more source ports comprise one or more Transmission Control Protocol ports.

15. The method of claim 13, wherein the one or more source ports comprise one or more User Datagram Protocol ports.

16. The method of claim 1, wherein the one or more network characteristics comprise one or more destination ports.

17. The method of claim 16, wherein the one or more destination ports comprise one or more Transmission Control Protocol ports.

18. The method of claim 16, wherein the one or more destination ports comprise one or more User Datagram Protocol ports.

19. The method of claim 1, wherein the one or more network characteristics comprise one or more flags.

20. The method of claim 19, wherein the one or more flags comprise Transmission Control Protocol flags.

21. The method of claim 19, wherein the one or more flags comprise Internet Control Message Protocol flags.

22. The method of claim 1, wherein the first packet network comprises at least one Asynchronous Transfer Mode network.

23. The method of claim 1, wherein the packet network comprises at least one Internet Protocol network.

24. The method of claim 1, wherein the frequency of occurrences comprises a number of occurrences in an amount of time.

25. The method of claim 1, wherein each of the one or more lists comprise a group of more frequently occurring instances of the one or more network characteristics.

26. The method of claim 1, wherein each of the one or more lists comprise a group of most frequently occurring instances of the one or more network characteristics.

27. The method of claim 1, wherein a number of instances in each of the one of more lists is substantially equal to or greater than a quotient, wherein the quotient comprises a router capacity rate divided by a threshold flooding rate.

28. The method of claim 1, wherein the first network node comprises at least a router.

29. The method of claim 1, wherein the plurality of messages comprises a plurality of Internet Protocol packets.

30. The method of claim 1, wherein the updating comprises updating at one or more nodes of the at least the first network node.

31. The method of claim 1, wherein the updating comprises updating at one or more nodes of at least a second network node.

32. The method of claim 31, wherein the second network node comprises at least a packet sniffer.

33. The method of claim 31, wherein the second network node comprises at least a router.

34. The method of claim 1, wherein the plurality of messages comprises a plurality of Asynchronous Transfer Mode cells.

35. The method of claim 1, wherein the detecting comprises recording the plurality of messages.

36. The method of claim 1, wherein traveling near at least the first network node comprises traveling through the first network node.

37. The method of claim 1, wherein the first network node comprises a router.

38. The method of claim 1, wherein the detecting comprises detecting at one or more nodes of the at least the first network node.

39. The method of claim 1, wherein the detecting comprises detecting at one or more nodes of at least a second network node.

40. The method of claim 39, wherein the second network node comprises at least a packet sniffer.

41. The method of claim 39, wherein the second network node comprises at least a router.

42. The method of claim 1, wherein the plurality of messages comprise multipath messages.

43. The method of claim 1, further comprising:
forwarding a message to at least a third network node;
responsive to receiving the message, updating a second plurality of one or more lists of a second plurality of one or more network characteristics of a second plurality of messages, such that the second plurality of one or more lists comprise a second plurality of instances of the second plurality of one or more network characteristics based on at least a second frequency of occurrences of the second plurality of instances.

44. The method of claim 43, wherein the updating comprises updating at one or more nodes of the at least the third network node.

45. The method of claim 43, wherein the updating comprises updating at one or more nodes of at least a fourth network node.

46. The method of claim 43, further comprising:
forwarding a message to at least a fifth network node to update a third plurality of one or more lists of a third plurality of one or more network characteristics of a third plurality of messages, such that the third plurality of one or more lists comprise a third plurality of instances of the third plurality of one or more network characteristics based on at least a third frequency of occurrences of the third plurality of instances.

47. The method of claim 1, further comprising:
preventing a message from transiting the first network node, wherein the message comprises a suspicious instance matching at least one of the instances of the one or more network characteristics of the one or more lists.

48. The method of claim 47, wherein the suspicious instance comprises one or more source addresses associated with an attack.

49. The method of claim 48, wherein the one or more source addresses comprise one or more Internet Protocol addresses.

50. The method of claim 47, wherein the suspicious instance comprises one or more destination addresses associated with an attack.

51. The method of claim 50, wherein the one or more destination addresses comprise one or more Internet Protocol addresses.

52. The method of claim 47, wherein the suspicious instance comprises one or more source ports associated with an attack.

53. The method of claim 52, wherein the one or more source ports comprise one or more Transmission Control Protocol ports.

54. The method of claim 52, wherein the one or more source ports comprise one or more User Datagram Protocol ports.

55. The method of claim 47, wherein the suspicious instance comprises one or more destination ports associated with an attack.

56. The method of claim 55, wherein the one or more destination ports comprise one or more Transmission Control Protocol ports.

57. The method of claim 55, wherein the one or more destination ports comprise one or more User Datagram Protocol ports.

58. The method of claim 57, wherein the suspicious instance comprises one or more flags associated with an attack.

59. The method of claim 58, wherein the one or more flags comprise Transmission Control Protocol flags.

60. The method of claim 58, wherein the one or more flags comprise Internet Control Message Protocol flags.

61. The method of claim 47, wherein the preventing comprises filtering messages traveling the first packet network near the first network node.

62. The method of claim 47, wherein the preventing is responsive to receiving a message from an attacked network node.

63. The method of claim 62, wherein the attacked network node received a flooding attack.

64. The method of claim 62, wherein the attacked network node received a denial of service attack.

65. The method of claim 47, further comprising:
repeatedly updating of the one or more lists and removing, from the one or more lists, instances having a low frequency of occurrences; and
comparing the suspicious instance with the repeatedly updated one or more lists, and if the comparing fails to result in a match, halting the preventing.

66. The method of claim 65, wherein the halting the preventing comprises removing a filter, wherein the filter prevented messages comprising the suspicious instance from transiting the first network node.

67. The method of claim 1, further comprising:
receiving a message caused by an attacked network node.

68. The method of claim 67, wherein the message comprises a network identifier of the attacked network node.

69. The method of claim 67, wherein the message comprises a cookie generated by the attacked network node.

70. The method of claim 67, wherein the attacked network node received a flooding attack.

71. The method of claim 67, wherein the attacked network node received a denial of service attack.

72. The method of claim 67, wherein the attacked network node sent the message.

73. The method of claim 67, wherein an intermediate network node, coupled somewhere between the attacked network node and the node receiving the message, sent the message.

74. The method of claim 73, wherein the node receiving the message comprises the second network node.

75. The method of claim 73, wherein the node receiving the message comprises a third network node.

76. The method of claim 67, further comprising:
responsive to the receiving, comparing the instances of the one or more network characteristics with a suspicious instance comprised in the message caused by the attacked network node.

77. The method of claim 76, further comprising:
if the comparing results in a match, then forwarding, towards one or more suspect network nodes, the message comprising the suspicious instance, wherein each of the one or more suspect network nodes comprises one or more nodes that an attack on the attacked network node possibly transited to reach the attacked network node.

78. The method of claim 77, wherein the forwarded message comprises updated information.

79. The method of claim 77, wherein the updated information comprises a network identifier of a node forwarding the message.

80. The method of claim 76, further comprising:
if the comparing fails to result in a match, then sending, towards the attacked network node, a report message.

81. The method of claim 80, wherein the report message comprises a network identifier of a source of an attack on the attacked network node.

82. The method of claim 77, wherein the forwarding is based at least on at least one of the instances of the one or more network characteristics comprised in the maintained one or more lists.

* * * * *